June 19, 1962 B. G. CRAMER 3,040,189

MONOSTABLE MULTIVIBRATOR CONTROLLING A THRESHOLD CIRCUIT

Filed Nov. 1, 1960

INVENTOR.
BRUCE G. CRAMER
BY
AGENT

United States Patent Office 3,040,189
Patented June 19, 1962

3,040,189
MONOSTABLE MULTIVIBRATOR CONTROLLING A THRESHOLD CIRCUIT

Bruce G. Cramer, Philadelphia, Pa., assignor, by mesne assignments, to Philco Corporation, Philadelphia, Pa., a corporation of Delaware Filed Nov. 1, 1960, Ser. No. 66,595
6 Claims. (Cl. 307—88.5)

This invention relates to electrical circuits for generating two or more pulses of different durations.

In many applications, for example in the fields of radar systems and computers, it is often desirable to produce two separate pulses beginning substantially at the same time but having different durations. One way in which this has been accomplished in the past is to trigger two separate astable, or "one-shot," multivibrators at the same time, the timing circuits of the multivibrators being so arranged that the pulses produced by one multivibrator in response to the trigger are of different durations than those produced by the other multivibrator. While such circuits are satisfactory in providing the required function, they require two complete multivibrator circuits with the attendant expense and complexity of circuitry and cost of operation.

It is therefore an object of this invention to provide an improved circuit of the multivibrator type in which two separate pulses of different durations are produced in response to each input pulse.

Another object of the invention is to provide said pulses of different widths so that each of the pair of separate pulses begins at substantially the same instant of time.

A further object is to provide such an improved circuit which is simpler and cheaper in construction and operation than previously known circuits for providing this same function.

In accordance with the invention the above-identified objects are achieved by providing a multivibrator of the well-known type in which two current discharge devices, such as transistors or vacuum-tubes, are interconnected so that an impulse from one of the devices causes the other device to operate in a low-conduction condition for a period of time determined by a timing circuit, and then to return to a conducting condition. The timing circuit of this multivibrator includes a resistance-capacitance (RC) network which determines the time for which one of said devices is in its low-conduction state. This low-conduction state is initiated by an impulse which charges the capacitor of the timing circuit to a voltage at which substantially all current flow in said one device is cut off. The capacitor then discharges through the associated resistor until it reaches a "turn-on" level at which said one device begins again to conduct and resumes its high-conduction state. In accordance with the invention the resistive element of this RC combination is provided with a tap or connection intermediate the ends thereof, at which tap there exists a voltage which varies similarly to the voltage controlling the switching of said one device but which, because of its position at a tap point on the resistive element, decays to a voltage equal to said "turn-on" voltage before the voltage at the control element of said one device has decayed to this level. A third current discharge device is connected to said tap point or intermediate connection so that it too is cut off by the impulse which cuts off said one device in said multivibrator thereby to initiate a pulse in said third device at substantially the same time as in said one device, and is turned on again when the voltage at said tap reaches said "turn-on" level. Since the voltage at said tap reaches the "turn-on" level before the voltage controlling said one device does, the pulse produced by said third device ends before the pulse from said one device. The result is that said third current discharge device produces pulses which begin at the same time as those produced by said one device in said multivibrator but which are of lesser duration. By adjustment of the position of said tap on the timing resistor the difference in the widths of the pulses from said one device and from said third device can be controlled.

Other objects and features of the invention will be more fully understood from a consideration of the following detailed description taken in connection with the accompanying drawings, in which.

Figures 1, 2, 3:
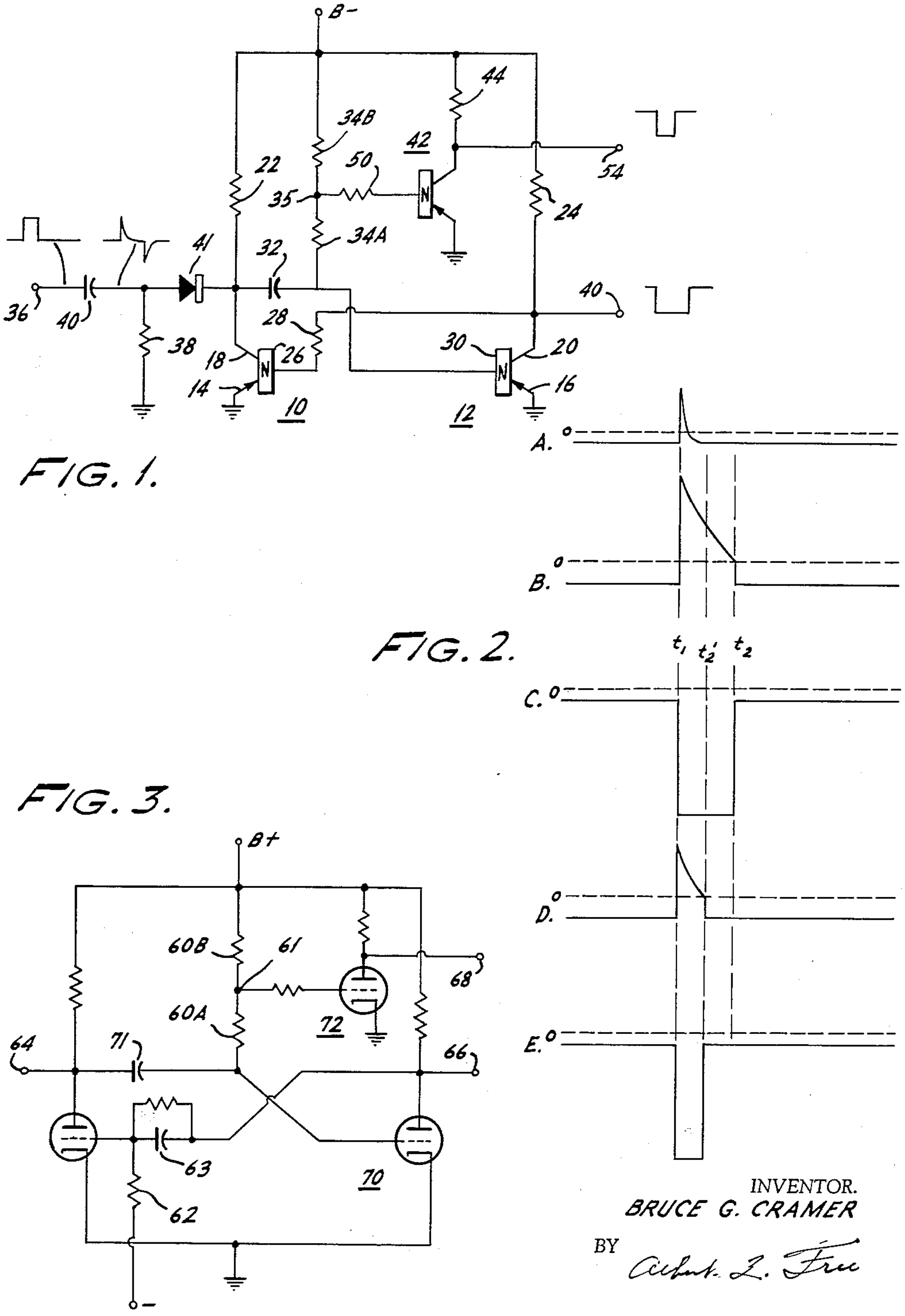
FIGURE 1 is a schematic representation of a circuit embodying the invention in one of its forms.
FIGURE 2 is a graphical representation to which reference will be made in explaining the manner of operation of the circuit of FIGURE 1.
FIGURE 3 is a schematic diagram of a circuit embodying the invention and utilizing vacuum tubes as the current discharge devices.

Considering in detail first the circuit of FIGURE 1, this circuit consists essentially of a standard transistor "one-shot" multivibrator in which the resistor in the timing circuit has been split into two portions and a connection made between these two portions to which the control element of another transistor is connected to provide operation in accordance with the invention.

Thus transistors 10 and 12, which for illustration are shown as having N-type bases and are typically of the alloy-junction or surface-barrier types, are each connected in the common-emitter circuit configuration with their respective emitter elements 14 and 16 directly connected to a reference potential designated as ground and their respective collector elements 18 and 20 connected by way of respective resistors 22 and 24 to a common source of negative supply potential designated as B—. The collector 20 of transistor 12 is connected to the base 26 of transistor 10 by way of a current limiting resistor 28, while the collector of transistor 10 is connected for pulse signals to the base 30 of transistor 12 by way of the coupling capacitor 32. The base 30 of transistor 12 is also connected to the source of negative supply voltage B— through the split or tapped resistor 34A, 34B having a tap connection 35. It is understood that resistor 34A, 34B may comprise physically a single resistor with a fixed or movable tap, or two separate series-connected resistors as shown.

The triggering input terminal 36 is connected by way of the resistance-capacitance differentiating circuit 38, 40 and clipping diode 41 to the collector of transistor 10. The portion of the circuit thus far described constitutes a conventional "one-shot" multivibrator, with the addition of the tap provided between the resistors 34A and 34B. In this circuit the transistor 12 is normally held in strong conduction by the relatively strong negative bias supplied to its base by way of the split resistor 34A, 34B with the result that the potential of the collector 20 of transistor 12 is sufficiently close to ground to maintain the base of transistor 10 at a potential for which transistor 10 is substantially completely cut off. The trigger pulse supplied to input terminal 36 is differentiated by the RC circuit 38, 40 to produce a positive pip corresponding to the leading edge of the input pulse and a negative pip corresponding to the trailing edge of the input pulse, only the positive portion of the differentiated pulse passing through the diode 41 to the collector of transistor 10. The effect of this narrow positive trigger pulse, when passed through capacitor 32 to the base of transistor 12, is to reduce current flow in transistor 12 substantially instantaneously so that the potential of the collector of transistor 12 suddenly becomes more negative and produces conduction in transistor 10, which in turn tends to make the potential of the collector of transistor 10 substantially more positive, a change which is again passed through capacitor 32 to the base of transistor 12 to provide a regenerative cutting off of transistor 12 and a regenerative turning on of transistor 10. After this transient interval in which transistor 12 is turned off and transistor 10 turned on, the potential at the base of transistor 12 begins to decay in the negative direction toward the negative supply voltage B— due to discharge of capacitor 32 by way of resistor 34A, 34B. When this potential has decayed to the value at which the base of transistor 12 is sufficiently negative to re-initiate conduction in transistor 12, transistor 12 begins to conduct heavily and transistor 10 is cut off in regenerative fashion. The result of this complete cycle of operation, as in conventional one-shot multivibrators, is to produce at the output terminal 40, connected to collector 20 of transistor 12, a negative output pulse for each input trigger pulse, the output pulse beginning substantially at the same time as the occurrence of the trigger pulse and terminating at a time thereafter determined by the time constant of the discharge of capacitor 32 through resistor 34A, 34B.

In accordance with the invention there is further employed an additional transistor 42, which in this embodiment is of the same type as transistors 10 and 12 and is also connected in the common-emitter circuit configuration with its emitter directly grounded and its collector connected through a load resistor 44 to the negative supply source B—. The base of transistor 42 is connected to the tap point 35 of resistor 34A, 34B, preferably by way of a small current-limiting resistor 50. The position of tap point 35 on resistor 34A, 34B is adjusted so that the potential at tap 35 when transistor 12 is first cut off by the transient positive potential applied to its base 30 is also sufficient to cut off transistor 42. As the potential at the base 30 of transistor 12 begins to decay negatively toward the supply potential B—, the voltage at tap point 35 decays similarly. However, since tap 35 is located at a point nearer the supply potential source than is the base of transistor 12, tap 35 decays to a potential for which transistor 42 again becomes conductive prior to the time at which transistor 12 resumes conduction. The result of this operation is that a negative output pulse is produced at the output terminal 54 connected to the collector of transistor 42, which output pulse begins at substantially the same instant as the pulse at output terminal 40 but which terminates earlier.

Accordingly there are produced at the output terminals 40 and 54 two separate pulses in response to each input pulse at input terminal 36, said separate pulses beginning at substantially the same instant but having different durations, as desired. To provide this operation there is required only the basic multivibrator circuit plus the single additional transistor 42, its load resistor 44 and the tap 35, the small resistor 50 also preferably being employed to limit the current flow during the time of conduction of transistor 42 but not being essential to operation. This is in contrast to arrangements of the prior art which, in addition to the basic multivibrator circuit shown, would require a complete second multivibrator circuit using two transistors and associated triggering diode.

Referring now to FIGURE 2 for a fuller understanding of the details of operation of the circuit of FIGURE 1, there is represented at A the voltage wave-form of a typical triggering impulse occurring at time $t_1$ at the collector of transistor 10. In the several graphs of FIGURE 2 the vertical axes represent voltage measured to a common scale with ground potential as the zero reference value, while the horizontal axes measure time to a common scale and from a common origin for all figures. Wave form B represents the potential produced at the base 30 of transistor 12, and wave form C represents that produced at the collector of transistor 12. As shown in B, the base of transistor 12 is initially substantially negative with respect to ground so that transistor 12 is conducting heavily, but upon the occurrence of the input trigger pulse at time $t_1$ and the consequent switching off of transistor 12 and switching on of transistor 10, base 30 is driven positively by an amount substantially equal to the shift in potential of the collector of transistor 10 in going from its normal low-conduction condition to its astable conducting condition. After the trigger pulse has terminated the potential at the base of transistor 12 does not disappear immediately, but because of the time constant of capacitor 32 and resistor 34A, 34B decays relatively slowly toward the negative supply potential until the time $t_2$ at which it has decayed to about zero voltage, when transistor 12 begins to conduct again. At this time the regenerative action of the multivibrator causes transistor 12 to resume its heavily conductive stable condition and the base voltage of transistor 12 therefore returns to its original value as shown. Meanwhile the collector voltage of transistor 12, which as shown at C was initially only slightly negative to ground due to heavy conduction in transistor 12, assumes a much more negative voltage at time $t_1$ when transistor 12 is cut off and remains at substantially this same large negative voltage until time $t_2$ when transistor 12 again becomes conductive. At time $t_2$ the collector voltage of transistor 12 returns to its original near-zero value, and the result of this cycle of operation is the large negative pulse shown at C of FIG. 2 having a duration extending substantially from time $t_1$ to time $t_2$.

The potential at the base of transistor 42 is shown at D of FIG. 2. Immediately prior to the time $t_1$ transistor 42 is highly conductive, its base being appreciably negative with respect to ground and its collector, as shown at E of FIG. 2, being substantially at ground potential. Upon the occurrence of the triggering pulse shown at A and the resultant turning on of transistor 12, the base of transistor 42 is driven positively by an amount which is proportional to the change in the potential of base 30 of transistor 10, but of smaller magnitude since only a fixed fraction of the voltage appearing at the base 30 of transistor 12 appears at the tap point 35. When the triggering interval is over the voltage at the tap 35 begins to decay negatively as shown in FIG. 2D in the same general manner as the potential at the base of transistor 12, but because it was initially driven less far positive it reaches the region of zero potential at a time $t_2'$ prior to the time $t_2$ at which the potential of the base of transistor 12 reaches this voltage region. Since the base of transistor 42 when cut off is at substantially the same potential as tap 35, transistor 42 becomes conductive at the time $t_2'$ prior to the time $t_2$ at which transistor 12 becomes conductive, and the collector pulse of transistor 42 shown at E therefore also terminates at the earlier time $t_2'$ and hence is shorter than the collector pulse of transistor 12 shown at C.

As will be appreciated from the foregoing the amount by which the duration of the output pulse from transistor 42 is less than that of the output pulse from transistor 12 increases as the resistance between the tap 35 and the source of negative supply potential is decreased, since the base-to-emitter voltage of transistor 42 during its non-conductive period will then constitute a smaller fraction of the base-to-emitter voltage of transistor 12 and hence will decay to the turn-on level sooner. When the tap point 35 is adjusted toward the end of resistor 34A, 34B connected to the negative supply, care should be taken to assure that the impulse which cuts off transistor 12 is of sufficient magnitude at tap 35 to cut off transistor 42 also.

In one typical example of the form of the invention shown in FIG. 1 the circuit elements and values employed were as follows:

| | | |
|---|---|---|
| Resistors **22, 24, 28, 38** and **44** | ohms | 1,800 |
| Resistor **34A** | do | 1,500 |
| Resistor **34B** | do | 3,300 |
| Resistor **50** | do | 1,000 |
| Capacitor **32** | microfarad | 0.022 |
| Capacitor **40** | micromicrofarads | 100 |
| Supply voltage B— | volts | —5 |

In this example diode 41 was a conventional crystal rectifier and transistors 10, 12 and 42 were surface-barrier transistors. The input triggering pulse at terminal 36 was one volt in amplitude and 5 microseconds in duration, and the output pulses at terminals 40 and 54 had durations of about 30 microseconds and 15 microseconds respectively.

While the invention has been illustrated in FIGURE 1 using transistors having N-type bases as the current discharge devices it will be obvious to one skilled in the art that a directly analogous circuit can be constructed using transistors having P-type bases, with appropriate changes in the polarities of applied potentials.

As shown in FIG. 3 the invention may also be embodied in circuits utilizing vacuum tubes as the current discharge elements. This circuit utilizes as the basic "one-shot" multivibrator portion of the circuit an entirely conventional form of circuit like that shown in Radiation Laboratory Series, Volume 19, "Waveforms," page 168, FIG. 5.10 with the exception that the timing resistor 60A, 60B of FIG. 3 is divided into two parts by a tap 61. The conventional portion of this circuit is also directly analogous to that utilized in the transistor form of the invention shown in FIGURE 1, the only changes being substitution of vacuum tubes for transistors, reversal of the polarity of supply potential for the vacuum tubes, use of an additional biasing resistor 62 to provide the grid-bias conditions required for vacuum tubes, and use of the bypass capacitor 63 which is preferably used in the vacuum tube forms of the invention to provide more rapid regenerative action. In this circuit an impulse applied to input terminal 64 produces at output terminal 66 and at output terminal 68 two separate pulses, each beginning at substantially the same time but the pulse at output terminal 66 being of greater duration than that at output terminal 68. The general operation of the circuit is directly analogous to that described with respect to FIGURES 1 and 2 hereof, the voltage at the grid of tube 70 being driven negative during the pulse to cut off tube 70 after which capacitor 71 discharges through resistor 60A, 60B to the level at which tube 70 again becomes conductive. Prior to this time tube 72 becomes conductive since the voltage supplied to its grid from tap 61 is more positive than that at the grid of tube 70.

The invention may also be applied to provide more than two separate output pulses in response to a single input pulse, each of the pulses having different durations, by adding further taps on the timing resistor and connecting additional current discharge devices to these respective taps, each of the additional current discharge devices producing an additional output pulse. It will also be obvious to one skilled in the art that the multivibrator circuit arrangement utilized need not be of the "one-shot" type but instead may be of the astable, or free-running, multivibrator type, and in fact any of a wide variety of multivibrator types may be utilized provided that there is included therein a timing circuit producing a discharge voltage across a resistor for turning a current discharge device on and off and on which resistor a suitable tap may be located in accordance with the present invention to turn on and off an additional current discharge device.

While in the interest of complete definiteness the invention has been described with particular reference to specific embodiments thereof, it may also be embodied in a variety of other forms differing from those specifically described without departing from the scope of the invention as defined by the appended claims.

I claim:

1. A plural-pulse generating system comprising: a multivibrator including a timing circuit for controlling the durations of pulses produced by said multivibrator, said timing circuit comprising a capacitive element and a resistive element having a first terminal maintained at a reference potential and a second terminal connected to said capacitive element, said multivibrator producing pulses each beginning when the potential at said second terminal has a first value and terminating when said potential has decayed to a second value; a connection to said resistive element intermediate said first and second terminals thereof having a potential varying in response to variations in said potential at said second terminal but differing therefrom; and an electronic switch device having two current states and having a control element supplied with potential from said connection for switching said device between said two current states, said device being responsive to the occurrence at said connection of the potential produced by said first value of potential at said second terminal to assume one of said current states and being responsive to the occurrence at said connection of said second value of potential at said second terminal to assume the other of said current states.

2. In a plural-pulse generating system: a multivibrator for producing a series of pulses, said multivibrator comprising first and second current-discharge devices each having a current-control electrode and each operated alternately in a low-conduction state and a high-conduction state in response to signals supplied to said control electrode thereof from the other of said devices, said multivibrator also comprising a timing circuit for determining the duration of each interval during which said second device is in said low-conduction state, said timing circuit being connected in the signal path between said first device and said control electrode of said second device and comprising the combination of a resistive element and a capacitive element, said combination being responsive to an impulse from said first device to charge said capacitive element and to apply to said control element of said second device a first value of potential of a magnitude and polarity to operate said second device in its low-conduction state, said capacitive element then discharging through said resistive element so that the potential at said control electrode decays to a second value at which said high-conduction state is initiated in said second device; a connection to a point intermediate the ends of said resistive element at which point the potential varies in the same sense as the potential at said control electrode of said second device, said first value of said potential at said control electrode of said second device producing at said connection a third value of potential less than said first potential and the potential produced at said connection by said impulse decaying to substantially said second value of potential before the potential at said control electrode of said device decays to said second value; and a third current-discharge device having a control electrode supplied with signals from said connection, said third device being responsive to the occurrence of said third value of potential at said connection to assume a low-conduction state and being responsive to changes of said potential at said connection from said third value to said second value to be switched from a low-conduction state to a high-conduction state, whereby said third device is operated in said low-conduction state for a shorter time following said impulse than is said second device.

3. A system in accordance with claim 2, in which said first, said second and said third current-discharge devices comprise first, second and third transistors respectively, in which said capacitor is connected between the collector electrode of said first transistor and the base electrode of said second transistor and in which said resistive element has one terminal connected to said base electrode of said second transistor, said system also comprising a resistive element connecting said connection to the base electrode of said third transistor.

4. A transistor plural-pulse generating system comprising: a monostable multivibrator including a first and a second amplifying stage comprising respectively a first transistor and a second transistor each connected in the common-emitter circuit configuration, a capacitive element connecting the collector electrode of said first transistor to the base electrode of said second transistor, a signal connection from the collector electrode of said second transistor to the base electrode of said first transistor, a resistive element having one terminal connected to the base electrode of said second transistor and means for supplying the other terminal of said resistive element with a potential for maintaining said second transistor normally strongly conductive; means for supplying a pulse to the collector electrode of said first transistor to trigger said multivibrator to its monostable state in which said second transistor is substantially non-conductive and to charge said capacitive element; a connection to said resistive element between said one and said other terminal thereof; a third transistor connected in the common-emitter circuit configuration; and means for supplying the base electrode of said third transistor with signals from said connection; said multivibrator producing at the base electrode of said second transistor, upon said triggering, a potential sufficient to render said third transistor substantially non-conductive, said third transistor resuming substantial conduction prior to the recurrence of substantial conduction in said second transistor.

5. A system in accordance with claim 4, comprising a resistive element connected between the base electrode of said third transistor and said connection to said resistive element for limiting current flow to said last-named base electrode.

6. A system in accordance with claim 4, in which the emitter electrodes of said second and third transistors are biased at substantially the same potential, and comprising a source of collector operating potential and resistors connecting the collector electrodes of each of said first, second and third electrodes directly to said source.

References Cited in the file of this patent

UNITED STATES PATENTS 3,007,060 Guenther ------------- Oct. 31, 1961